UNITED STATES PATENT OFFICE.

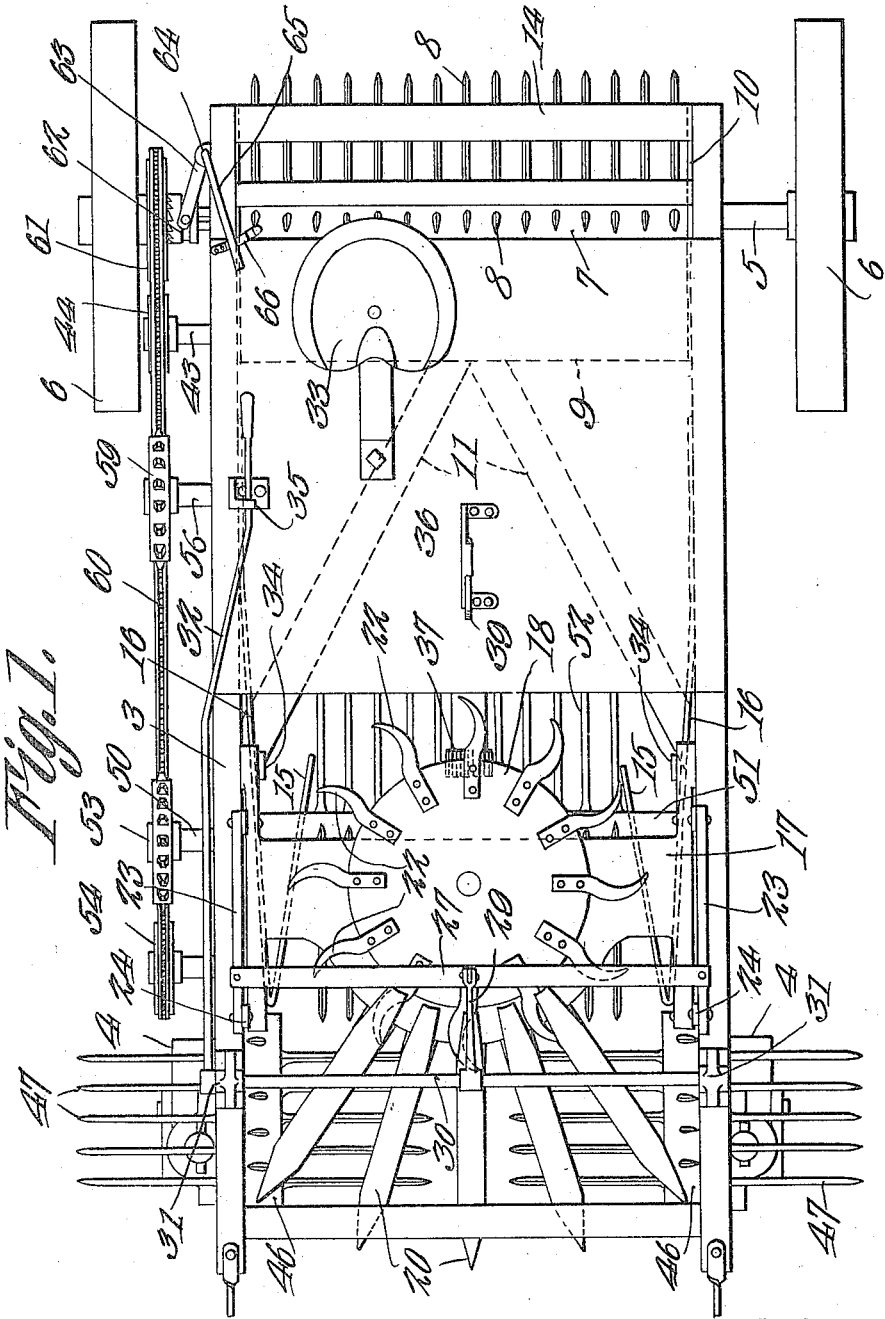

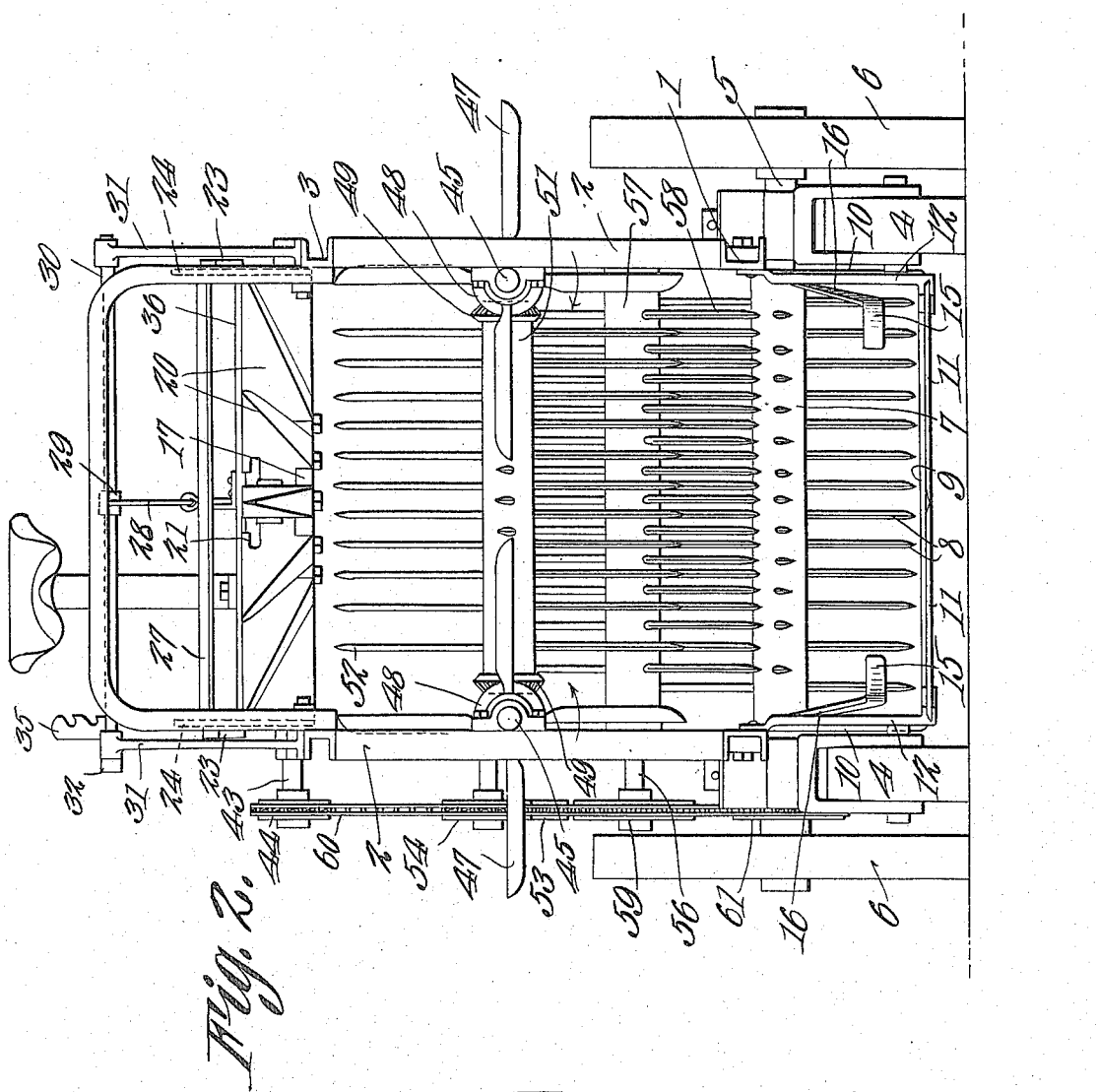

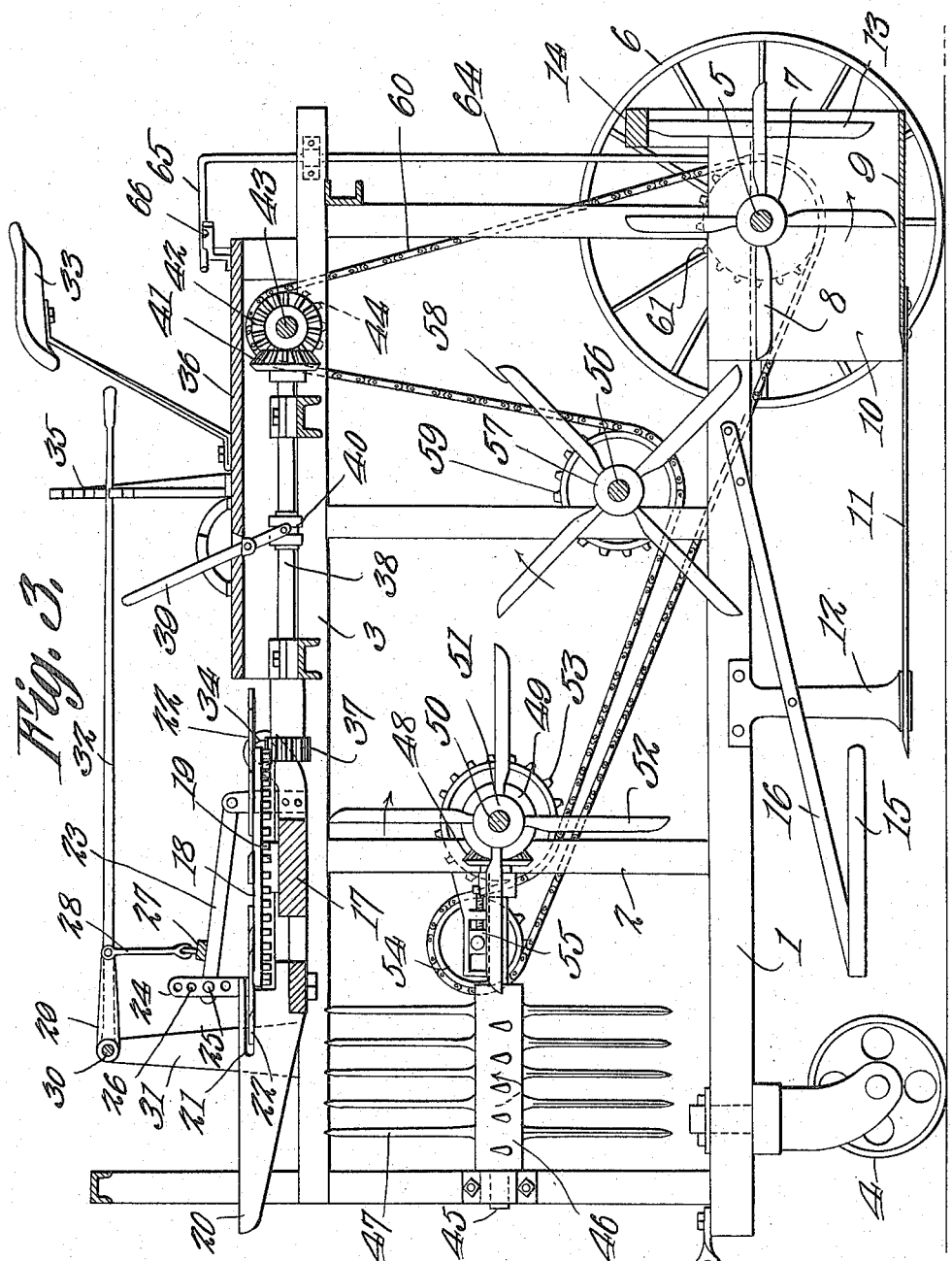

THOMAS M. FULBRIGHT, OF RENTIESVILLE, OKLAHOMA, ASSIGNOR OF ONE-THIRD TO JOSEPH S. BRUMMEL AND ONE-THIRD TO FRANK WILLIAMS.

MACHINE FOR TOPPING AND COMMINUTING STALKS.

1,169,793.     Specification of Letters Patent.     Patented Feb. 1, 1916.

Application filed April 29, 1915.   Serial No. 24,836.

*To all whom it may concern:*

Be it known that I, THOMAS M. FULBRIGHT, a citizen of the United States, residing at Rentiesville, in the county of McIntosh and State of Oklahoma, have invented a new and useful Machine for Topping and Comminuting Stalks, of which the following is a specification.

This invention relates to machines for topping and comminuting stalks while standing in the field, one of the objects of the invention being to provide novel topping mechanism which can be quickly adjusted upwardly and downwardly, thus to adapt it for use in connection with stalks of different heights, such adjustment in no way interfering with the continuous operation of the cutting or topping mechanism.

A further object is to provide improved means for chopping the stalks, said means being so positioned as to insure the cutting of the stalks throughout the length thereof.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a plan view of the machine. Fig. 2 is a front elevation thereof. Fig. 3 is a vertical longitudinal section therethrough.

Referring to the figures by characters of reference 1 designates the lower frame of the machine on which are disposed standards 2 supporting the upper frame 3. The front portion of the machine is supported by casters 4 while the rear portion has a transverse axle 5 adapted to be rotated by the rear supporting wheels 6. Secured to that portion of the axle 5 within the frame 1 is a sleeve 7 having radial stripping or cutting arms 8 thereon, these arms traveling close to a transverse plate 9 which is supported under the axle 5 by end hangers 10. The front edge of plate 9 is preferably sharpened so that the plate thus constitutes a cutter for severing stalks close to the ground. Forwardly diverging knives 11 extend from the center of the front portion of the plate 9 and are supported at their front ends by hangers 12 depending from the frame 1. The arms 8 work between fingers 13 which hang from a cross bar 14 supported upon the rear portion of the frame 1, these fingers extending close to the plate 9 back of the axle 5 and having their front edges sharpened. Forwardly diverging gathering fingers 15 are supported in advance of the blades 11 by side strips 16 secured to the frame 1 and hangers 12.

Pivotally mounted upon the upper frame 3 is a cross frame 17 on which is journaled a disk 18 having depending teeth 19. Extending forwardly from the cross frame 17 along lines radiating from the center of the disk 18 are gathering fingers 20 formed with transverse slots 21 in the rear portions thereof and extending outwardly from the periphery of disk 18 are heading knives 22 adapted to travel through the slots 21 as the disk 18 revolves. A bar 23 is pivotally connected to one side of the frame 17 and the forward end of this bar is adjustably connected to a bracket 24 extending upwardly from the front portion of the frame 17. The adjustment of bar 23 can be effected by removing a pin 25 therefrom and inserting it in any one of a series of apertures 26 formed in the bracket 24. It is to be understood that one of these bars 23 is located at each side of frame 17, the two bars being connected by a cross strip 27 to which is secured a link 28. This link is pivotally connected to an arm 29 extending from a transverse shaft 30 journaled in standards 31 upstanding from the side portions of the upper frame 3. A lever 32 is secured to one end portion of shaft 30 and its rear end is located adjacent the seat 33 to be occupied by the operator. Thus it will be seen that this lever can be readily moved upwardly or downwardly for the purpose of swinging the transverse frame 17 upwardly or downwardly about its pivot 34, thereby to raise or lower the fingers 20 and adapt the mechanism for use in connection with stalks of different heights. A rack 35 extends upwardly from a platform 36 which is erected on the top frame 3 and this rack is adapted to be engaged by lever 32, thus to hold said lever against accidental movement after it has once been shifted to a desired position.

The teeth 19 mesh with a gear 37 secured to the front end portion of a longitudinal shaft 38, the teeth on gear 37 being of considerable length so as to permit a longitudinal movement of shaft 38 and gear 37. This movement is effected by means of a lever 39 fulcrumed on the platform 36 close to the seat 33 and which works within a collar 40 having an annular groove therein as shown. A gear 41 is provided at the rear end of shaft 38 and is adapted to mesh with a gear 42 secured to a transverse shaft 43 having a sprocket 44 at its outer end. By shifting lever 39, gear 41 can be moved into or out of mesh with gear 42, thus to control the operation of disk 18 and the topping blades carried thereby.

Journaled in certain of the standards 2 between the sides of the upper and lower frames 3 and 1, are longitudinal shafts 45 each of which has a sleeve 46 revoluble therewith and provided with series of radial stripping arms 47 having sharp advancing edges. Each of these shafts is provided at its rear end with a bevel gear 48 and these gears mesh with bevel gears 49 secured to the end portions of a transverse shaft 50 journaled between the upper and lower frames 3 and 1. To shaft 50 is secured a sleeve 51 having radial series of stripping blades 52 provided with sharp advancing edges, the blades or arms 52 working in planes at right angles to the planes of movement of the arms 47 and traveling close to the paths of said arms 47. A sprocket 53 is secured to one end of the shaft 50 and an idler sprocket 54 is adjustably mounted, as at 55, in advance of the sprocket 53. Another transverse shaft 56 is mounted between the lower frame 1 and the upper frame 3 and between the shafts 5 and 50, this shaft 56 having a sleeve 57 revoluble therewith and from which extend radial series of stripping arms or blades 58 having sharp advancing edges. A sprocket 59 is secured to one end of the shaft 56.

As shown especially in Fig. 3 the shafts 5, 56 and 50 are disposed in a plane inclined upwardly and forwardly from the shaft 5 so that the blades radiating from the shafts will engage stalks at different elevations and thus insure the comminution of the stalks. An endless chain 60 extends under a drive sprocket 61 which is loosely mounted on the axle 5 and one flight of this chain passes over the sprocket 44, thence downwardly under sprocket 59, thence forwardly under sprocket 53, and finally into engagement with sprocket 54 from which it returns to the drive sprocket 61. A clutch member 62 is feathered on the axle 5 and is adapted to be shifted into and out of engagement with the sprocket 61, thus to couple said sprocket to or uncouple it from the axle. Any suitable means may be provided for shifting the clutch member 62. For example, a forked arm 63 may engage the clutch member, this arm being located at the lower end of a vertical shaft 64 the upper end of which is provided with an actuating arm 65 adapted to be held in either of two positions by a bracket 66.

It is to be understood that the machine herein described may be propelled forward in any suitable manner. The machine is adapted to straddle a row of stalks and, as it moves forward with sprocket 61 coupled to the rear axle 5, motion will be transmitted from said sprocket to the various transverse shafts with the result that the various stripping or cutting arms or blades 47, 52, 58 and 8 will be simultaneously rotated in the directions indicated by the arrows in Figs. 2 and 3. Furthermore the longitudinal shaft 38 will be driven by gears 42 and 41 provided said gears are in mesh. The actuation of shaft 38 will result in the rotation of disk 18 and the movement of the topping blades 22 through the slots 21 in the gathering fingers 20. As the machine travels along a row of stalks, these stalks are gathered between the fingers 20 and, while passing between said fingers, are acted upon by the upwardly moving knives or fingers 47 to thus operate to strip the stalks. As the stalks approach the disk 18 the knives or blades 22 remove the tops, after which the standing stalks on leaving the paths of the blades 47 are engaged by the rotating series of blades or arms 52 and further cut. This cutting action is continued by the arms or blades 58 and finally the lower portions of the stalks are severed by the blades 11 and the front or cutting edge of the plate 9, whereupon the slit stalks are deposited on the plate 9 and cut up by the arms or blades 8 and the depending fingers 13, the comminuted stalks being discharged at the rear end of the machine.

What is claimed is:—

1. In a machine of the class described, the combination with a movably supported structure, a transverse cutter fixed relative thereto, spaced depending fingers thereabove, and revoluble cutters above the transverse cutter and coöperating with the fingers, of a revoluble series of cutting elements in front of and above the fixed transverse cutter and working in planes extending longitudinally of the structure, a second revoluble series of cutting elements in front of and above the fixed transverse cutter and working in substantially vertical planes extending transversely of the structure, topping mechanism supported above said cutters, and means for simultaneously actuating the topping mechanism and cutters during the forward movement of the structure.

2. A machine of the class described including a wheel supported structure, a transverse cutter fixedly mounted thereunder and movable therewith, revoluble series of cutting elements within said structure and disposed at different elevations, certain of said elements being supported above and close to the fixed cutter, side series of revoluble cutting members adjacent the front end thereof and working in substantially vertical planes extending transversely of the structure, gathering fingers, a gear adjacent thereto, topping blades revoluble with the gear and through the fingers, means for rotating the gear, the gathering fingers and topping blades being located above the side series of revoluble cutting members, means for adjusting the gathering fingers and topping blades angularly during the actuation of said gear, and means for simultaneously actuating all of the cutting members.

In testimony that I claim the foregoing as my own, I have hereto affixed my signature in the presence of two witnesses.

THOMAS M. FULBRIGHT.

Witnesses:
HERMAN BRUMMEL,
J. H. GUNDLACH.

Copies of this patent may be obtained for five cents each, by addressing the "Commissioner of Patents Washington, D. C."